United States Patent Office 3,153,054
Patented Oct. 13, 1964

3,153,054
PROCESS FOR SEPARATING TOCOPHEROLS AND STEROLS FROM DEODORIZER SLUDGE AND THE LIKE
Winton Brown, Rochester, N.Y., assignor to Eastman Kodak Company, Rochester, N.Y., a corporation of New Jersey
No Drawing. Filed Mar. 20, 1962, Ser. No. 181,156
6 Claims. (Cl. 260—345.6)

This invention relates to the chemical arts. More particularly, it relates to sterols and tocopherols and the separation of these compounds from deodorizer sludge and the like.

Tocopherols and sterols are complex alcohols of well-known utilities. α-Tocopherol and its esters are employed in vitamin preparations because of their vitamin E activity whereas the non-α-tocopherols are useful as antioxidants and as intermediates for making α-tocopherol. The sterols are useful as raw materials in the preparation and synthesis of adrenal cortical and sex hormones.

Tocopherols and sterols occur in natural fats and oils and particularly in vegetable oils. When such fats and oils are subjected to deodorization treatment in a conventional deodorizer, that is, blown under vacuum with an inert gas such as steam, nitrogen and the like, a material is removed therefrom by the gas. This material is usually separated from the gas in traps, condensers and the like as a by-product sludge. This by-product sludge is commonly referred to as deodorizer sludge. It is also termed deodorizer distillate, hot well scum, lighter-than-water scum, clabber stock, condenser oil, deodorizer trap oil, catch basin scum and the like. Invariably the tocopherols and sterols initially in the oil or fat being deodorized are found to be concentrated in this deodorizer sludge. However, the concentrations of the tocopherols and sterols are still quite low. For example, a typical total tocopherols concentration is one generally in a range from about 1 to about 12% by weight.

Deodorizer sludge is a very complex mixture. In addition to tocopherols and sterols there are usually present in the sludge at substantial concentrations higher fatty acid esters of sterols, mixed higher fatty acid glycerides, free higher fatty acids, hydrocarbons and other materials. For pharmaceutical and other uses concentrates of tocopherols and sterols must have high purities. Consequently, for these uses it is necessary to separate tocopherols and sterols from other components of deodorizer sludge.

This has led to the development of a number of processes for the treatment of deodorizer sludge to separate therefrom concentrates of tocopherols and sterols of high purities. However, while some of these processes have been commercially acceptable, none have been completely satisfactory for a number of reasons. For instance, some processes involve admixing large quantities of alkali and the like with the sludge in order to hydrolyze and saponify the esters that are present. The quantities are stoichiometrically in great excess in order to obtain maximum hydrolysis and saponification. This reduces substantially the tocopherols yield because the tocopherols are extremely labile under basic pH conditions in the presence of alkali and the like. Some processes result in substantial concentrations of sterol esters in both the tocopherols products and sterols products obtained thereby. Consequently, there is a need for improvement in the treatment of deodorizer sludge and the like to obtain therefrom tocopherols and sterols.

An object of this invention is to provide a new process for separating tocopherols and sterols from deodorizer sludge and the like.

This object and others are achieved by this invention which, in summary, involves a process broadly comprising two basic steps.

The first basic step of the process of this invention is effecting fractional, liquid-liquid extraction of deodorizer sludge with a polar liquid solvent and a nonpolar liquid solvent at a volumetric ratio of polar solvent to nonpolar solvent selected so that more of the fatty acids and monoglycerides are dissolved by the polar liquid solvent than by the nonpolar liquid solvent while more of the tocopherols, sterols, sterol esters, triglycerides, diglycerides and hydrocarbons are dissolved by the nonpolar liquid solvent than by the polar liquid solvent. As a result there are formed a first polar solvent solution or first raffinate fraction rich in fatty acids and monoglycerides but poor or lean in tocopherols, sterols, sterol esters, triglycerides, diglycerides and hydrocarbons and a first nonpolar solvent solution or first extract fraction immiscible with the first polar solvent solution and poor in fatty acids and monoglycerides but rich in tocopherols, sterols, sterol esters, triglycerides, diglycerides and hydrocarbons.

The second basic step of the process of this invention is effecting fractional, liquid-liquid extraction of the components of the first nonpolar liquid solution or first extract fraction with a polar liquid solvent and a nonpolar liquid solvent at a volumetric ratio of polar solvent to nonpolar solvent selected so that more of the sterols and tocopherols are dissolved by the polar liquid solvent than by the nonpolar liquid solvent while more of the sterol esters, triglycerides, diglycerides and hydrocarbons are dissolved by nonpolar liquid solvent than by the polar liquid solvent. Thus, there are obtained a second polar solvent solution or second solvent fraction rich in tocopherols and sterols but poor or lean in sterol esters, triglycerides, diglycerides and hydrocarbons, and a second nonpolar solvent solution or second raffinate fraction immiscible with the second polar solvent solution and poor or lean in tocopherols and sterols but rich in sterol esters, triglycerides, diglycerides and hydrocarbons.

The two basic steps of the process of this invention involve polar and nonpolar liquid solvents. The distinction between, and characteristics of, polar and nonpolar liquid solvents are well known in the art. In general, polar liquid solvents such as water, methyl alcohol, acetone and the like are characterized by the presence in their molecules of hydroxyl groups or carbonyl groups associated with strong polarity, by high dielectric constants which are evidence of such polarity, and by water miscibility. In general, nonpolar liquid solvents such as benzene, hexane, carbon disulfide and the like are characterized by weakly polar molecular structures and, accordingly, low dielectric constants. In general, nonpolar liquid solvents are water immiscible. Indeed, a characteristic of polar and nonpolar liquid solvents is the general immiscibility of polar liquid solvents with nonpolar liquid solvents. Partial miscibility frequently does exist, depending upon how strongly polar or nonpolar the two solvents are. However, under the concepts of this invention there must be sufficient immiscibility not only of the solvents but of the solutions formed in the first basic step after admixture of the solvents with the deodorizer sludge and the second basic step after admixture of the solvents with the sludge components of the first extract fraction, so that the results of both steps are two liquid phases. Each solvent under the concepts of this invention can be a single liquid or a miscible mixture of liquids as long as the immiscibility condition exists.

In accordance with this invention the nonpolar liquid solvent in the first basic step must dissolve tocopherols, sterols, sterol esters, triglycerides, diglycerides and hydrocarbons while the polar solvent must dissolve at least to a limited extent fatty acids and monoglycerides. As a practical matter the polar solvent and the nonpolar solvent in the first step are usually selective only in respect to hydrocarbons, sterol esters and triglycerides. Generally speaking, sterols, tocopherols, monoglycerides, diglycerides and fatty acids are soluble to various degrees in both polar solvents and nonpolar solvents. Because of this fact solvent ratio in each basic step plays an important part in this invention.

In the first basic step the solvent ratio, that is to say, the volume ratio of polar liquid solvent to nonpolar liquid solvent, is selected so that upon admixture of the solvents with deodorizer sludge more of the fatty acids and monoglycerides are dissolved by the polar solvent than by the nonpolar liquid solvent. This condition is satisfied by a rather broad range of solvent ratios. In this regard this condition is dependent on a number of variables including the solvents involved, temperature, deodorizer sludge composition, etc. However, the optimum solvent ratio can be approximated from the equation $$R = \sqrt{\frac{1}{C_T \times C_A}}$$

wherein R is the solvent ratio (volumetric basis), $C_T$ is the distribution coefficient of the tocopherols in the solvent system to be employed in the first basic step at the intended temperature of extraction and $C_A$ is the distribution coefficient or partition ratio of the fatty acids in the solvent combination to be employed at the intended temperature of extraction. $C_T$ and $C_A$ are determined by application of the following equations.

$$C_T = \frac{W}{W'}$$

wherein W stands for grams of tocopherols per 100 milliliters of polar liquid solution and W' stands for grams of tocopherols per 100 milliliters of nonpolar liquid solution, and $$C_A = \frac{A}{A'}$$

wherein A stands for grams of fatty acids per 100 milliliters of polar liquid solution and A' stands for grams of fatty acids per 100 milliliters of nonpolar liquid solution.

The quantities W and W' for the tocopherols equation can be determined by taking a 1 gram sample of tocopherols approximating the tocopherols composition of the deodorizer sludge, admixing the sample with 100 milliliters of each solvent to be employed, separating the resulting phases, measuring the volume of each phase, removing the solvents, in each case weighing the tocopherols and then calculating for each case the weight of tocopherols per 100 milliliters of solution. The quantities A and A' for the fatty acids equation can be determined by taking a 1 gram sample of fatty acids approximating the fatty acids composition of the deodorizer sludge, admixing the sample with 100 milliliters of each solvent to be employed, separating the resulting phases, measuring the volume of each phase, removing the solvents from each phase, in each case weighing the fatty acids which remain, and then calculating for each case the weight of fatty acids per 100 milliliters of solution.

Examples of polar solvent-nonpolar solvent combinations or pairs which can be used in the first basic step of the process of this invention are (the percentages given being by volume):

| Polar Liquid Solvent | Nonpolar Liquid Solvent | Preferred Extraction Temp., °C. | Preferred Solvent Ratio Range | Preferred Solvent Ratio |
|---|---|---|---|---|
| Methanol (96%)+water (4%) | Hexane | 25 | 0.9–4 | 3.4 |
| Acetonitrile | do | 25 | 3.5–7.4 | 6.3 |
| Dimethylformamide | do | 4 | 0.6–1.4 | 1.2 |
| Furfural | do | 25 | 1.1–2.3 | 2.0 |
| Dimethylsulfoxide | do | 25 | 1.8–4.0 | 3.4 |

These are optimum solvent pairs for deodorizer sludge with the ratio of total solvents in milliliters to the sludge in grams being about 20:1. Thus, in the case of the methanol + water polar solvent and hexane nonpolar solvent pair, about 0.5% by volume of the polar solvent is the minimum water concentration needed to obtain a 2-phase system. The concentration of water can be as high as about 5% by volume of the polar solvent without adversely affecting the relative distribution coefficients of the tocopherols and the fatty acids. If the water concentration of this polar solvent is in excess of about 5% by volume, the distribution coefficients are so small as to require an inordinately high ratio of polar solvent to nonpolar solvent in this particular solvent pair. On the other hand, in this methane + water solvent and hexane solvent pair, if the water content of the polar solvent is too low, the density difference between the two phases becomes so small, due to mutual solubility, as to make phase separation too slow to be practical. Hence, a water concentration of 4% by volume of the polar solvent (mixture of methanol and water) is a practical compromise.

Temperature has an effect on density difference between the two phases. One way of effectively increasing the density difference between the two phases without substantially adversely affecting the distribution coefficients is by an increase in the temperature. In the case of the solvent pair dimethylformamide and hexane, 4° C. is an optimum temperature.

Other solvent pairs can be employed in the first basic step of the process of this invention. For example, there is the pair composed of the polar solvent: ethanol (83% by volume) plus water (17% by volume), and the nonpolar solvent: hexane. An example of another solvent pair is the polar solvent: acetonitrile (80% by volume) plus methanol (20% by volume), and the nonpolar solvent: isoheptane. Still another example of a suitable solvent pair is phenol (85% by volume) plus water (15% by volume) as the polar solvent and octane as the nonpolar solvent. In general, however, it is preferred that the polar liquid solvent comprise at least one lower, monohydric, aliphatic alcohol (an alcohol having 1–6 carbon atoms) such as, for example, methanol, ethanol and the like. The reason for this preference is to provide an environment at all times in both phases (both polar and nonpolar liquid solvents have a degree of mutual solubility) adverse to esterification of the sterols by interaction between the sterols and the various esters that are present.

Not only must the polar solvent and nonpolar solvent result in two immiscible phases in the first step of the process of this invention, but such phases under the conditions of this step must not form stable emulsions. Stated another way, the two phases must be rapid breaking; phase separation must take place at a practical rate. In some instances, in order to meet this requirement, an emulsion breaker, preferably an edible, nontoxic, surface active compound or composition, can be added to one of the liquid solvents and preferably the polar solvent.

The polar and nonpolar liquid solvents employed in the second basic step of the process of this invention can be the same as, or different from, the polar and nonpolar liquid solvents employed in the first basic step of the process of this invention. Generally speaking, however, it is more practical to employ the same polar and nonpolar liquid solvents.

In the second basic step of the process of this invention the nonpolar solvent must dissolve nonsteroid esters (which include triglycerides and diglycerides) while the polar solvent must dissolve at least to a limited extent sterols and tocopherols. Again, it is observed that as a practical matter polar solvents and nonpolar solvents are usually selective only with respect to hydrocarbons, sterol esters, and triglycerides. Generally speaking, sterols, tocopherols and diglycerides are soluble to various extents in both polar and nonpolar solvents. For this reason, solvent ratio plays an important part also in this second basic step.

The solvent ratio of polar liquid solvent to nonpolar liquid solvent in the second basic step is selected so that upon admixture of the solvents with the sludge components of the first extract fraction resulting from the first basic step, more of the tocopherols and sterols are dissolved by the polar liquid solvent than by the nonpolar liquid solvent. This requirement admits of a rather broad range of solvent ratios. The reason is that it is dependent on a number of variables including the solvents involved, temperature, composition of the first extract fraction, etc. However, the optimum solvent ratio can be approximated from the equation:

$$R = \sqrt{\frac{1}{C_T \times C_E}}$$

wherein R is solvent ratio (volumetric basis), $C_T$ is the distribution coefficient of the tocopherols in the solvent system or combination to be employed at the intended temperature of extraction and $C_E$ is the distribution coefficient of the nonsteroid esters (mainly triglycerides and diglycerides) in the solvent combination to be employed at the intended temperature of extraction. $C_T$ is determined by application of the equation:

$$C_T = \frac{W}{W'}$$

wheren W and W' have the same significance as before but in relation to the solvent pair to be employed in this second basic step. $C_E$ is determined by application of the equation:

$$C_E = \frac{Q}{Q'}$$

wherein Q represents grams of nonsteroid esters per 100 milliliters of polar liquid solution and Q' represents grams of nonsteroid esters per 100 milliliters of nonpolar liquid solution. The quantities of W and W' for the tocopherols equation are determined in the same manner as described herein relative to the first basic step of this process of this invention. Of course, the solvents employed in this second basic step are the ones used in making such determination and the sample of tocopherols approximates in tocopherol components and proportions the tocopherol components of the first extract fraction. The quantities Q and Q' for the nonsteroid esters equation can be determined by taking a 1 gram sample of triglycerides and diglycerides approximating the nonsteroid esters composition of the first extract fraction, admixing the sample with 100 milliliters of each solvent to be employed in the second basic step, separating the resulting phases, measuring the volume of each phase, removing the solvents from each phase, in each case weighing the nonsteroid esters which remain and then calculating for each case the weight of nonsteroid esters per 100 milliliters of solution.

Examples of polar solvent-nonpolar solvent combinations or pairs which can be employed in the second basic step of the process of this invention are (the percentages given being by volume):

| Polar Liquid Solvent | Nonpolar Liquid Solvent | Preferred Extraction Temp., °C. | Preferred Solvent Ratio Range | Preferred Solvent |
|---|---|---|---|---|
| Methanol (96%)+water (4%) | Hexane | 25 | 4–9 | 6.6 |
| Acetonitrile | do | 25 | 5.0–6.4 | 6.0 |
| Furfural | do | 25 | 1.7–2.2 | 2.1 |
| Dimethylformamide | do | 4 | 1.5–1.9 | 1.8 |
| Dimethylsulfoxide | do | 25 | 5.4–6.8 | 6.4 |

Again, these are optimum solvent pairs for the components of the first extract fraction with the ratio of the total solvents in milliliters to total components in grams being about 50:1. The same considerations relative to density differences as expressed in conjunction with the first basic step of the process are likewise applicable here. Likewise, other solvent pairs such as those previously mentioned in conjunction with the first basic step can be employed in this second basic step. Again, however, it is preferred that the polar liquid solvent comprise at least one lower monohydric alcohol as in the first basic step in order to minimize esterification of sterols by interaction between the sterols and the various esters (triglycerides and diglycerides) which are present.

It is required in this second basic step also that the polar solvent and nonpolar solvent must result in two immiscible phases, that these phases must not form stable emulsions and that these phases must be rapid breaking. Accordingly, in some instances an edible, nontoxic surface active agent, functionable as an emulsion breaker, can be incorporated into one of the liquid solvents and preferably the polar solvent.

In proceeding from the first basic step to the second basic step of the process of this invention, usually at least part, if not all, of the solvent is removed from the first extract fraction. When the nonpolar solvent in the first extract fraction is different from that employed in the second basic step, generally all of the nonpolar solvent is removed. When the nonpolar solvent in the first extract fraction is the same kind as that in the second basic step, the first extract fraction usually contains more nonpolar solvent than desired for optimum results and, therefore, a substantial portion of the nonpolar solvent is removed from the first extract fraction before going to the second basic step. In this latter situation the nonpolar solvent portion of the first extract fraction is considered as part of the total nonpolar solvent employed in this second step and, in order to obtain optimum extraction, the proportion of fresh nonpolar solvent admixed with the components of the first extract fraction should be adjusted so that the total nonpolar solvent involved is at the desired solvent ratio.

Both basic steps of the process of this invention in its broader aspects are preferably performed by admixing the material to be extracted (the deodorizer sludge in the first step and the sludge components of the first extract fraction in the second step) with both the polar liquid solvent and the nonpolar liquid solvent, whereby, in each step, a two phase mixture results, and then separating one phase from the other. Considering the total two phase mixture of the first step, the deodorizer sludge concentration thereof is generally in a range of from about 1 to about 15 grams for each 100 milliliters of the solvents considered collectively (total solvents) with a preferred concentration being about 5 grams per 100 milliliters of total solvents. Likewise, in the case of the two phase mixture in the second basic step the slude components of the first extract fraction are at a total concentration generally in a range from about 1 to about 15 grams per 100 milliliters of total solvents, a preferred concentration of the components together being about 2 grams per 100 milliliters of total solvents.

The two phase mixture in the first basic step comprises a polar liquid solution or first raffinate extract fraction and a nonpolar liquid solution or first extract fraction. Under the concepts of this invention the two fractions are immiscible and do not form stable emulsions under the prevailing process conditions. Hence, after admixture has been completed coalescence of phases and phase separation takes place. The phases are removed from one another as by decantation, centrifugation and the like.

The two phase mixture in the second basic step comprises a polar liquid solution referred to herein as the second extract fraction and a nonpolar liquid solution referred to herein as the second raffinate fraction. Similarly, the two fractions in this second basic step are immiscible and do not form stable emulsions under the prevailing process conditions. Hence, after admixture has taken place, under settling conditions coalescence of the phases and phase separation take place. The phases are removed from one another as by decantation, centrifugation and the like.

In the more specific and preferred aspects of this invention, both basic steps are each performed by a countercurrent procedure as on a stagewise basis [such as in the apparatus described by Scheibel in Ind. and Eng. Chem., 49, 1679–1684, particularly 1681–1683 (October 1957)] or on a continuous basis in an extraction column such as one of those described in Chemical Engineers' Handbook, Perry, 3rd ed., 747–753 (1950). A preferred extraction type column apparatus for these steps is that described in "Technique of Organic Chemistry, vol. III, Separation and Purification," second complete revised and augmented edition, Interscience Publishers, Inc., 376–386 (particularly shown on page 377) (1956).

The number of extraction stages (theoretical or actual stages of admixing and separating) in the first basic step is selected to give a first extract fraction as rich as practical in tocopherols and sterols but as poor as practical in fatty acids and monoglycerides, and a first raffinate fraction as poor as practical in tocopherols and sterols but as rich as practical in fatty acids and monoglycerides. The number of extraction stages (theoretical or actual stages of admixing and separating) in the second basic step is selected to give a second extract fraction as rich as practical in tocopherols and sterols but as poor as practical in sterol esters, triglycerides, diglycerides and hydrocarbons, and a second raffinate fraction as poor as practical in tocopherols and sterols but as rich as practical in sterol esters, triglycerides, diglycerides and hydrocarbons. The number of stages in the first basic step in general depends on the composition of the deodorizer sludge, the solvent ratio of the solvent pair, the degree of purity sought in the sterols and tocopherols, the efficiency of the extraction system, the apparatus employed, etc. Likewise, the number of stages in the second basic step in general depends on the composition of the first extract fraction, solvent ratio of the solvent pair, the degree of purity desired in the ultimate, sterols and tocopherols product, the efficiency of the extraction system, the apparatus employed, etc. Hence, for each batch of deodorizer sludge, a trial run of the process steps usually should be made in order to determine optimum conditions for each basic step.

In specific aspects of the process of this invention there is an additional step which comprises separating the second extract fraction into a sterols product and a tocopherols concentrate. This is performed by concentrating the extract fraction (as by evaporation of the polar solvent) to the point of incipient precipitation (crystallization) of sterols (in the case of methanol-water this is at a methanol-water concentration of about 5–10% by weight at 20° C.) and then establishing and maintaining for a suitable period of time the concentrated solution at a temperature in a range from about 0 to about 20° C., whereby crystallization of sterols takes place, and then separating as by filtration the crystalline sterols from the mother liquor. The time and temperature selected for crystallization depend on the extent of sterols removal desired. In general, however, a time of about 24 hours and a temperature of about 4° C. results in a practical maximum removal of sterols. The mother liquor which is the tocopherols product, is then further concentrated, if desired, by removing nonpolar solvent as by evaporation and then water washed to remove therefrom water soluble impurities.

It has been observed that in the first basic step of this invention the saturated fatty acids are more difficult to separate from the tocopherols than the unsaturated fatty acids. Consequently, the process of this invention is most effective in the case of deodorizer sludge derived from vegetable oils which have not previously been hydrogenated and which involve a substantial concentration of unsaturated fatty acid moieties.

In the more specific aspects of this invention the first basic step also comprises admixing with the deodorizer sludge at substantially the same time as the solvents an alkali metal hydroxide in proportion to just neutralize the higher fatty acids in the sludge. Examples of an alkali metal hydroxide are sodium hydroxide and potassium hydroxide. In the preferred embodiments of this invention wherein the first step is performed in a countercurrent extraction system the alkali metal hydroxide is introduced into the system along with the sludge. In this preferred aspect of the invention there is thereby obtained from the practice of the first basic step a raffinate fraction containing the alkali metal salts of the fatty acids rather than merely the free fatty acids. By introducing a stoichiometric amount (relative to the free, higher fatty acids in the sludge) of an alkali metal hydroxide along with the deodorizer sludge into the first step counter-current extraction system, the distribution or partition ratio ($C_A$) of the fatty acids is favorably altered without, however, disturbing the already favorable partition ratio ($C_T$) of the tocopherols (and also of the sterols) and, further, without creating a destructively basic pH condition relative to the tocopherols. As a result, there is an increase in the degree of separation of fatty acids (actually fatty acid salts or soaps) from the tocopherols and sterols for a given number of extraction stages and without subjecting the tocopherols to a destructively high pH condition.

When fatty acid neutralization is practiced, if the second extract fraction has a significant concentration of higher fatty acid salts, further improvement in the purity of the end products is achieved by washing the sludge components of the second extract fraction with water.

This invention is further illustrated by the following example of a specific embodiment thereof. This invention is not limited to this specific embodiment unless otherwise indicated.

EXAMPLE

This example illustrates the practice of a specific embodiment of the process of this invention.

The equipment employed in the practice of the first basic step of the process according to this specific embodiment is a 4-inch internal diameter, packed, vertically disposed, agitated, extraction column like that shown on page 377 of "Technique of Organic Chemistry, vol. III, Separation and Purification," previously referred to herein. The column has 20 actual stages which are equivalent to approximately 14 theoretical extraction stages. In addition, the infeed conduit, located at the eleventh actual stage from the bottom of the column, is provided with a mixing T.

The first basic step of this embodiment is performed as follows.

Continuously introduce a typical deodorizer sludge derived from soybean oil through the infeed conduit of this column at a rate of about 55.5 milliliters per minute (51 grams per minute). At the same time continuously introduce into the mixing T at a rate of about 33 milliliters per minute (28.7 grams per minute) of a solution composed of sodium hydroxide and methanol, the concentration of the sodium hydroxide being about 56 grams per liter of solution. Simultaneously with the introduction of deodorizer sludge and alcoholic sodium hydroxide, continuously introduce into the heavy phase solvent inlet in the region of the top of the column at a rate of about 715 milliliters per minute (572 grams per minute) the polar solvent: methanol (96% by volume) plus water (4% by volume), in solution equilibrium with (or saturated with) hexane. At the same time, continuously introduce into the light phase solvent inlet in the region of the bottom of the column at the rate of about 715 milliliters per minute (500 grams per minute) the nonpolar solvent: hexane, in equilibrium solutionwise with the polar solvent. When the column has become full commence continuous withdrawal at the rate of 682 milliliters per minute (489 grams per minute) nonpolar solvent solution or first extract fraction from the top of the column and at the rate of abou 780 milliliters per minute (638 grams per minute) polar solvent solution or first raffinate fraction from the outlet at the bottom of the column. Temperaure of operation is 35° C.

After about 6 hours' operation, steady state conditions will be in effect.

Typical results obtained upon evaporation of solvent from, and analysis of, first extract fraction and first raffinate fraction collected in a 34 hour run under steady state conditions at 35° C. in treating a typical deodorizer sludge derived from soybean oil are summarized in the following Table I. The first raffinate fraction was acidulated with dilute sulfuric acid before evaporation of solvent therefrom.

Table I

|  | Deodorizer Sludge | First Extract Fraction Oil | Acidulated First Raffinate Fraction Oil |
|---|---|---|---|
| Quantity in kilograms | 79.4 | 56.2 | .23 |
| Tocopherols (by Emmerie-Engle assay) in milligrams per gram | 102 | 141 | 0.7 |
| Sterols (by infrared assay) in percent by weight | 6.5 | 9.5 | <1 |
| Sterol esters (by infrared assay) in percent by weight | 23 | 23 | 0 |
| Mixed gylcerides (by infrared assay) in percent by weight | 13 | 18 | 0.9 (by diff.) |
| Fatty acids (by infrared assay) in percent by weight | 26.5 | 3.2 | 83.5 (by diff.) |

The quantity of tocopherols in the first extract fraction oil represents about 98.5% by weight of the tocopherols in the deodorizer sludge while the quantity of tocopherols in the first raffinate fraction oil represents only about 0.2% by weight of the tocopherols in the deodorizer sludge.

The equipment employed in the practice of the second basic step of the process according to this specific embodiment is the same as that employed in the practice of the first basic step.

To carry out the second basic step, continuously introduce first extract fraction oil through the infeed conduit into the column at an average rate of about 12.6 grams per minute (13.3 milliliters per minute). At the same time continuously introduce into the heavy phase solvent inlet in the region of the top of the extraction column the polar solvent of methanol (96% by volume) and water (4% by volume) at a rate of 835 milliliters per minute (670 grams per minute) and into the light phase solvent inlet in the region of the bottom of the extraction column the nonpolar solvent of hexane at a rate of 100 milliliters per minute (70 grams per minute). When the column is full, continuously withdraw second extract fraction from the heavy phase fraction outlet at the bottom of the column at a rate of about 850 milliliters per minute (675 grams per minute) and continuously withdraw second raffinate fraction from the light phase fraction outlet at the top of the column at a rate of about 108 milliliters per minute (78 grams per minute). After about 12 hours of operation under these conditions at about 35° C. steady state conditions will be in effect.

Typical data obtained upon analysis of the second extract fraction and second raffinate fraction collected in a 4 hour run at about 36° C. after an initial run of only about 8 hours are summarized in the following Table II. Again, in the case of each fraction, the solvent was removed by evaporation and the residual oil weighed and analyzed.

Table II

|  | First Extraction Fraction Oil | Second Extract Fraction Oil | Second Raffinate Fraction Oil |
|---|---|---|---|
| Quantity in kilograms | 3.03 | 1.19 | 1.87 |
| Tocopherols (by Emmerie-Engle assay) in milligrams per gram | 141 | 261 | 43 |
| Sterols (by infrared assay) in percent by weight | 9.5 | 24 | 0 |
| Sterol esters (by infrared assay) in percent by weight | 28 | 0 | 45 |
| Mixed glycerides (by infrared assay) in percent by weight | 18 | 23 | 18 |
| Fatty acids (by infrared assay) in percent by weight | 3.2 | 5.5 | 1 |

The quantity of tocopherols in the second extract fraction oil represents about 72.4% by weight of the tocopherols in the first extract fraction oil while the quantity of tocopherols in the second raffinate fraction oil represents only about 28% by weight of the tocopherols in the first extract fraction oil. The quantity of sterols in the second extract fraction oil represents almost 100% by weight of the sterols in the first extract fraction oil.

To separate the second extract fraction oil into a sterols product and a tocopherols product, dissolve the second extract fraction oil in approximately two volumes of acetone and winter the resulting solution at 4° C. for about 24 hours. Then, filter the crystalline sterols from the wintered solution. The filter cake is the sterols product while the filtrate is a tocopherols solution. Evaporate the acetone solvent from the tocopherols solution whereby a tocopherols concentrate, an oil, is obtained.

Typical yields under these conditions are 37 grams of sterols product having an infrared assay of free sterols at 73% by weight, and 82 grams of tocopherols concentrate having an Emmerie-Engel assay of tocopherols at 370 milligrams per gram.

It is within the purview of this invention to increase the yields of tocopherols and sterols by continuously recirculating a portion of one or more of the fractions or oil contents thereof. Thus, for example, a portion of the second extract fraction or second extract fraction oil can be introduced with the nonpolar solvent into the light phase solvent inlet of the extraction column employed in the practice of the second basic step of the process of this invention. Further examples of recirculation include introducing a portion of the second raffinate fraction or second raffinate fraction oil, for instance, to the infeed inlet of the extraction column in either one or both of the first and second extraction steps and, for instance, to the heavy phase solvent inlet along with the polar solvent in the extraction column of the second extraction step and introducing a portion of the first raffinate fraction or first raffinate fraction oil, for instance, to the infeed inlet of the extraction column in the first extraction step. Of course, in recirculating a portion or portions of one or more of the fractions or oil contents thereof, suitable adjustment of solvent ratios and total solvents is made for optimum results.

For economical reasons it is preferred that the solvents be recovered from the second extract fraction, from the portions of the first and second raffinate fractions not recirculated and from the first extract fraction when in the embodiment involved solvent is removed therefrom. In each case this is readily done by subjecting the fraction to conventional distillation procedures. The recovered solvents can be reused in this process.

Thus, there is provided a process for separating tocopherols and sterols from deodorizer sludge, which makes possible a clean separation of tocopherols and sterols from the other components of deodorizer sludge. This is accomplished by a physical method dependent on polarity rather than one based on molecular weight. An advantage of the process of this invention is that it preserves the tocopherols by avoiding strongly alkaline or acid pH conditions throughout the steps of the process.

Other features, advantages and embodiments of this invention will be apparent to those in the exercise of ordinary skill in the art after reading the foregoing disclosure. Although this invention has been described in considerable detail relative to a specific embodiment thereof, variations and modifications of this embodiment can be effected within the spirit and scope of the invention as described and claimed.

The embodiments of this invention in which an exclusive property or privilege is claimed are defined as follows:

1. A process for separating tocopherols and sterols from deodorizer sludge, which comprises: (1) effecting fractional, liquid-liquid extraction of said sludge with a polar liquid solvent and a nonpolar liquid solvent at a volumetric ratio of polar liquid solvent to nonpolar liquid solvent selected so that more higher fatty acids are dissolved by the polar liquid solvent than by the nonpolar liquid solvent while more tocopherols and sterols are dissolved by the nonpolar liquid solvent than by the polar liquid solvent, whereby there are obtained a first raffinate fraction rich in higher fatty acids but poor in tocopherols and sterols and a first extract fraction poor in higher fatty acids but rich in tocopherols and sterols; and (2) effecting fractional, liquid-liquid extraction of the sludge components of said first extract fraction with a polar liquid solvent and a nonpolar liquid solvent at a volumetric ratio of polar liquid solvent to nonpolar liquid solvent selected so that more tocopherols and sterols are dissolved by the polar liquid solvent than by the nonpolar liquid solvent and more sterol esters are dissolved by the nonpolar liquid solvent than by the polar liquid solvent, whereby there are obtained a second extract fraction rich in tocopherols and sterols but poor in sterol esters and a second raffinate fraction poor in tocopherols and sterols but rich in sterol esters.

2. A process for separating tocopherols and sterols from deodorizer sludge derived from soybean oil, which comprises: (1) admixing with said sludge a substantially stoichiometric quantity, relative to the higher fatty acids in said sludge, of sodium hydroxide, whereby said higher fatty acids are converted to sodium salts of higher fatty acids, and effecting fractional, liquid-liquid extraction of said sludge with a polar liquid solvent consisting essentially of methanol (about 96% by volume) and water (about 4% by volume) and a nonpolar liquid solvent consisting essentially of hexane, the volumetric ratio of said polar liquid solvent to said nonpolar liquid solvent being in a range from about 0.9 to about 4 and the proportion of said sludge to said solvents being in a range from about 1 to about 15 grams of said sludge for each 100 milliliters of total solvents, whereby there are obtained a first raffinate fraction rich in sodium salts of higher fatty acids but poor in tocopherols and sterols and a first extract fraction poor in sodium salts of higher fatty acids but rich in tocopherols and sterols; and (2) effecting fractional, liquid-liquid extraction of the sludge components of said first extract fraction with a polar liquid solvent consisting essentially of methanol (about 96% by volume) and water (about 4% by volume) and a nonpolar liquid solvent consisting essentially of hexane, the volumetric ratio of said polar liquid solvent to said nonpolar liquid solvent being in a range from about 4 to about 9 and the proportion of said sludge components of said first extract fraction to said solvents being in a range from about 1 to about 15 grams of said sludge components for each 100 milliliters of total solvents, whereby there are obtained a second raffinate fraction poor in tocopherols and sterols but rich in sterol esters and a second extract fraction rich in tocopherols and sterols but poor in sterol esters.

3. A process for separating tocopherols and sterols from deodorizer sludge derived from soybean oil, which comprises: (1) admixing with said sludge a substantially stoichiometric quantity, relative to the higher fatty acids in said sludge, of sodium hydroxide, whereby said higher fatty acids are converted to sodium salts of higher fatty acids, and effecting fractional, liquid-liquid extraction of said sludge with a polar liquid solvent consisting essentially of methanol (about 96% by volume) and water (about 4% by volume) and a nonpolar liquid solvent consisting essentially of hexane, the volumetric ratio of said polar liquid solvent to said nonpolar liquid solvent being in a range from about 0.9 to about 4 and the proportion of said sludge to said solvents being in a range from about 1 to about 15 grams of said sludge for each 100 milliliters of total solvents, whereby there are obtained a first raffinate fraction rich in sodium salts of higher fatty acids but poor in tocopherols and sterols and a first extract fraction poor in sodium salts of higher fatty acids but rich in tocopherols and sterols; and (2) admixing with the sludge components of said first extract fraction a substantially stoichiometric quantity, relative to the residual sodium salts of higher fatty acids therein, of dilute sulfuric acid, whereby said residual sodium salts are converted into higher fatty acids, and effecting fractional, liquid-liquid extraction of the sludge components of said first extract fraction with a polar liquid solvent consisting essentially of methanol (about 96% by volume) and water (about 4% by volume) and a nonpolar liquid solvent consisting essentially of hexane, the volumetric ratio of said polar liquid solvent to said nonpolar liquid solvent being in a range from about 4 to about 9 and the proportion of said sludge components of said first extract fraction to said solvents being in a range from about 1 to about 15 grams of said sludge components for each 100 milliliters of total solvents, whereby there are obtained a second raffinate fraction poor in tocopherols and sterols but rich in sterol esters and a second extract fraction rich in tocopherols and sterols but poor in sterol esters; and (3) separating said second extract fraction into a sterols product and a tocopherols product.

4. A process for separating tocopherols and sterols from deodorizer sludge, which comprises: (1) admixing with said sludge a substantially stoichiometric quantity, relative to the higher fatty acids in said sludge, of an alkali metal hydroxide, whereby said higher fatty acids are converted to higher fatty acid salts, and effecting fractional, liquid-liquid extraction of said sludge with a polar liquid solvent and a nonpolar liquid solvent at a volumetric ratio of polar liquid solvent to nonpolar liquid solvent selected so that more higher fatty acid salts are dissolved by the polar liquid solvent than by the nonpolar liquid solvent while more tocopherols and sterols are dissolved by the nonpolar liquid solvent than by the polar liquid solvent, whereby there are obtained a first raffinate fraction rich in higher fatty acid salts but poor in tocopherols and sterols and a first extract fraction poor in higher fatty acid salts but rich in tocopherols and sterols; and (2) effecting fraction, liquid-liquid extraction of the sludge components of said first extract fraction with a polar liquid solvent and a nonpolar liquid solvent at a volumetric ratio of polar liquid solvent to nonpolar liquid solvent selected so that more tocopherols and sterols are dissolved by the polar liquid solvent than by the nonpolar liquid solvent and more sterol esters are dissolved by the nonpolar liquid solvent than by the polar liquid solvent, whereby there are obtained a second extract fraction rich in tocopherols and sterols but poor in sterol esters and a second raffinate fraction poor in tocopherols and sterols but rich in sterol esters.

5. A process for separating a tocopherol from a mixture consisting essentially of a tocopherol, a higher fatty acid and a sterol ester, which comprises: (1) effecting fractional, liquid-liquid extraction of said mixture with a polar liquid solvent and a nonpolar liquid solvent at a volumetric ratio of polar solvent to nonpolar solvent selected so that more of the higher fatty acid is dissolved by the polar liquid solvent than by the nonpolar liquid solvent while more of the tocopherol is dissolved by the nonpolar liquid solvent than by the polar liquid solvent, whereby there are formed a first polar liquid solvent solution rich in the higher fatty acid but poor in the tocopherol and the sterol ester and a first nonpolar liquid solvent solution immiscible with the first polar liquid solvent solution and poor in the higher fatty acid but rich in the tocopherol and sterol ester; and (2) effecting fractional, liquid-liquid extraction of the tocopherol and sterol ester components of said first nonpolar solvent solution with a polar liquid solvent and a nonpolar liquid solvent at a volumetric ratio of polar liquid solvent to nonpolar liquid solvent selected so that more of the tocopherol is dissolved by the polar liquid solvent than by the nonpolar liquid solvent while more of the sterol ester is dissolved by the nonpolar liquid solvent than by the polar liquid solvent, whereby there are formed a second polar liquid solvent solution rich in the tocopherol but poor in the sterol ester and a second nonpolar liquid solvent solution immiscible with said second polar liquid solvent solution and poor in the tocopherol but rich in the sterol ester.

6. A process for separating a sterol from a mixture consisting essentially of a sterol, a higher fatty acid and a sterol ester, which comprises: (1) effecting fractional, liquid-liquid extraction of said mixture with a polar liquid solvent and a nonpolar liquid solvent at a volumetric ratio of polar solvent to nonpolar solvent selected so that more of the higher fatty acid is dissolved by the polar liquid solvent than by the nonpolar liquid solvent while more of the sterol is dissolved by the nonpolar liquid solvent than by the polar liquid solvent, whereby there are formed a first polar liquid solvent solution rich in the higher fatty acid but poor in the sterol and the sterol ester and a first nonpolar liquid solvent solution immiscible with the first polar liquid solvent solution and poor in the higher fatty acid but rich in the sterol and the sterol ester; and (2) effecting fractional, liquid-liquid extraction of the sterol and sterol ester components of said first nonpolar solvent solution with a polar liquid solvent and a nonpolar liquid solvent at a volumetric ratio of polar liquid solvent to nonpolar liquid solvent selected so that more of the sterol is dissolved by the polar liquid solvent than by the nonpolar liquid solvent while more of the sterol ester is dissolved by the nonpolar liquid solvent than by the polar liquid solvent, whereby there are formed a second polar liquid solvent solution rich in the sterol but poor in the sterol ester and a second nonpolar liquid solvent solution immiscible with said second polar liquid solvent solution and poor in the sterol but rich in the sterol ester.

References Cited in the file of this patent
UNITED STATES PATENTS

| | | |
|---|---|---|
| 2,321,928 | McFarlane | June 15, 1943 |
| 2,349,275 | Hickman | May 23, 1944 |
| 2,379,420 | Baxter et al. | July 3, 1945 |
| 2,412,766 | Buxton | Dec. 17, 1946 |
| 2,454,692 | Embree et al. | Nov. 23, 1948 |
| 2,499,778 | Quaife | Mar. 7, 1950 |
| 2,508,387 | Hixson et al. | May 23, 1950 |
| 2,679,503 | Christenson | May 25, 1954 |
| 2,905,677 | Fevig et al. | Sept. 22, 1959 |

FOREIGN PATENTS

| | | |
|---|---|---|
| 480,483 | Canada | Jan. 22, 1952 |

OTHER REFERENCES

Weissberger: Technique of Organic Chemistry, vol. III, Part I (Separation and Purification), pages 332–393, Interscience Publ., New York (1956).